US008239993B1

(12) United States Patent
Chiong

(10) Patent No.: US 8,239,993 B1
(45) Date of Patent: Aug. 14, 2012

(54) VEHICLE WASHING APPARATUS

(76) Inventor: Edwin L. Chiong, Syosset, NY (US)

( * ) Notice: Subject to any disclaimer, the term of this patent is extended or adjusted under 35 U.S.C. 154(b) by 573 days.

(21) Appl. No.: 12/536,604

(22) Filed: Aug. 6, 2009

(51) Int. Cl.
*B60S 3/04* (2006.01)
(52) U.S. Cl. .......................................... 15/53.1; 15/97.3
(58) Field of Classification Search ............... 15/53.1, 15/97.3, DIG. 2; 150/166; 296/136.01, 136.02
See application file for complete search history.

(56) References Cited

U.S. PATENT DOCUMENTS

| | | |
|---|---|---|
| 3,594,842 A | 7/1971 | Clark |
| 3,641,606 A | 2/1972 | Lee |
| 3,662,418 A | 5/1972 | Kamiya |
| 3,675,262 A | 7/1972 | Mello |
| 4,453,284 A | 6/1984 | Schleeter |
| D408,104 S | 4/1999 | Adam |

*Primary Examiner* — Shay Karls

(57) ABSTRACT

A vehicle washing apparatus includes a covering that is positionable on a vehicle. A cleaning assembly is rotatably mounted to the housing and extends downwardly from a bottom wall of the cleaning assembly. A drive assembly is mounted in the housing and is mechanically coupled to the cleaning assembly. The drive assembly rotates the cleaning assembly when the drive assembly is turned on. A track is attached to a bottom side of the covering and is coupled to the housing so that the housing is movable along the track. A drive member is mounted in the housing and engages the track. The drive member is mechanically coupled to the drive assembly. The drive assembly rotates the drive member to move the housing along the track when the drive member is turned on. The housing travels along the track while the cleaning assembly cleans the vehicle.

8 Claims, 5 Drawing Sheets

100:
VEHICLE WASHING APPARATUS

FIELD OF THE DISCLOSURE

The disclosure relates to vehicle washing devices and more particularly pertains to a new vehicle washing device for positioning on a vehicle so that the vehicle is automatically washed with the device.

SUMMARY OF THE DISCLOSURE

An embodiment of the disclosure meets the needs presented above by generally comprising a covering that is positionable on a vehicle. The covering is flexible and has a top side and a bottom side. A housing has a top wall, a bottom wall and a perimeter wall that is attached to and extends between the top and bottom walls. A cleaning assembly is rotatably mounted to the housing and extends downwardly from the bottom wall. A drive assembly is mounted in the housing and is mechanically coupled to the cleaning assembly. The drive assembly rotates the cleaning assembly when the drive assembly is turned on. A track is attached to the bottom side of the covering and is coupled to the housing so that the housing is movable along the track. A drive member is mounted in the housing and engages the track. The drive member is mechanically coupled to the drive assembly. The drive assembly rotates the drive member to move the housing along the track when the drive member is turned on. The housing travels along the track while the cleaning assembly cleans the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
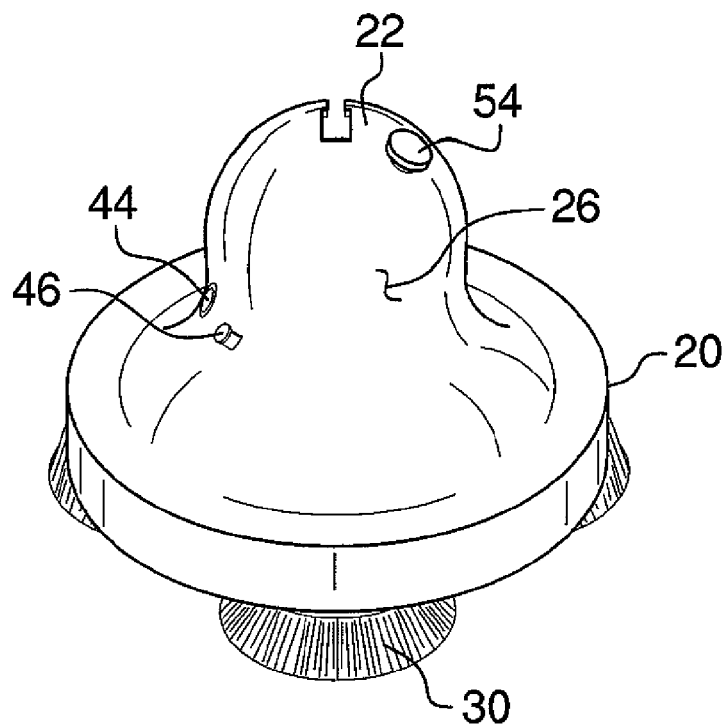
FIG. 1 is a top perspective view of a housing of a vehicle washing apparatus according to an embodiment of the disclosure.
Figure 2:
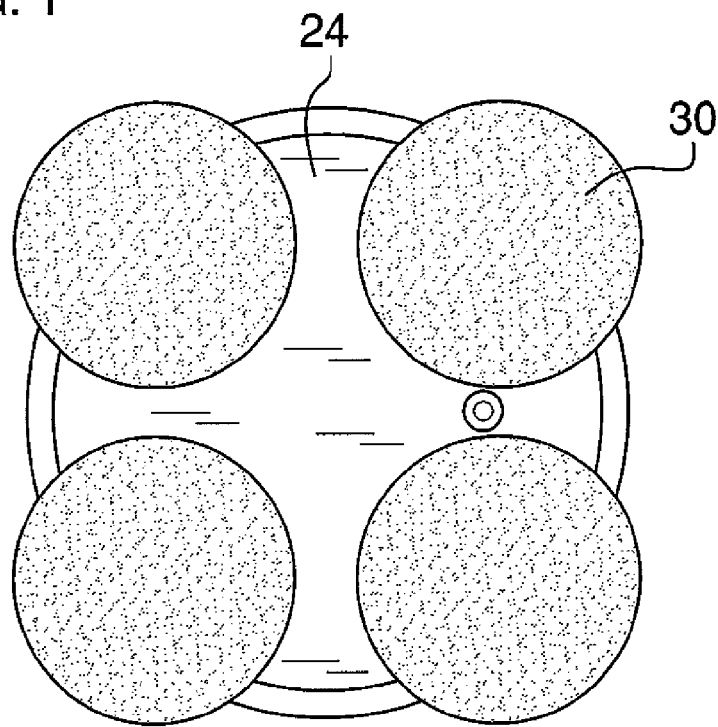
FIG. 2 is a bottom view of the housing of an embodiment of the disclosure.
Figure 3:
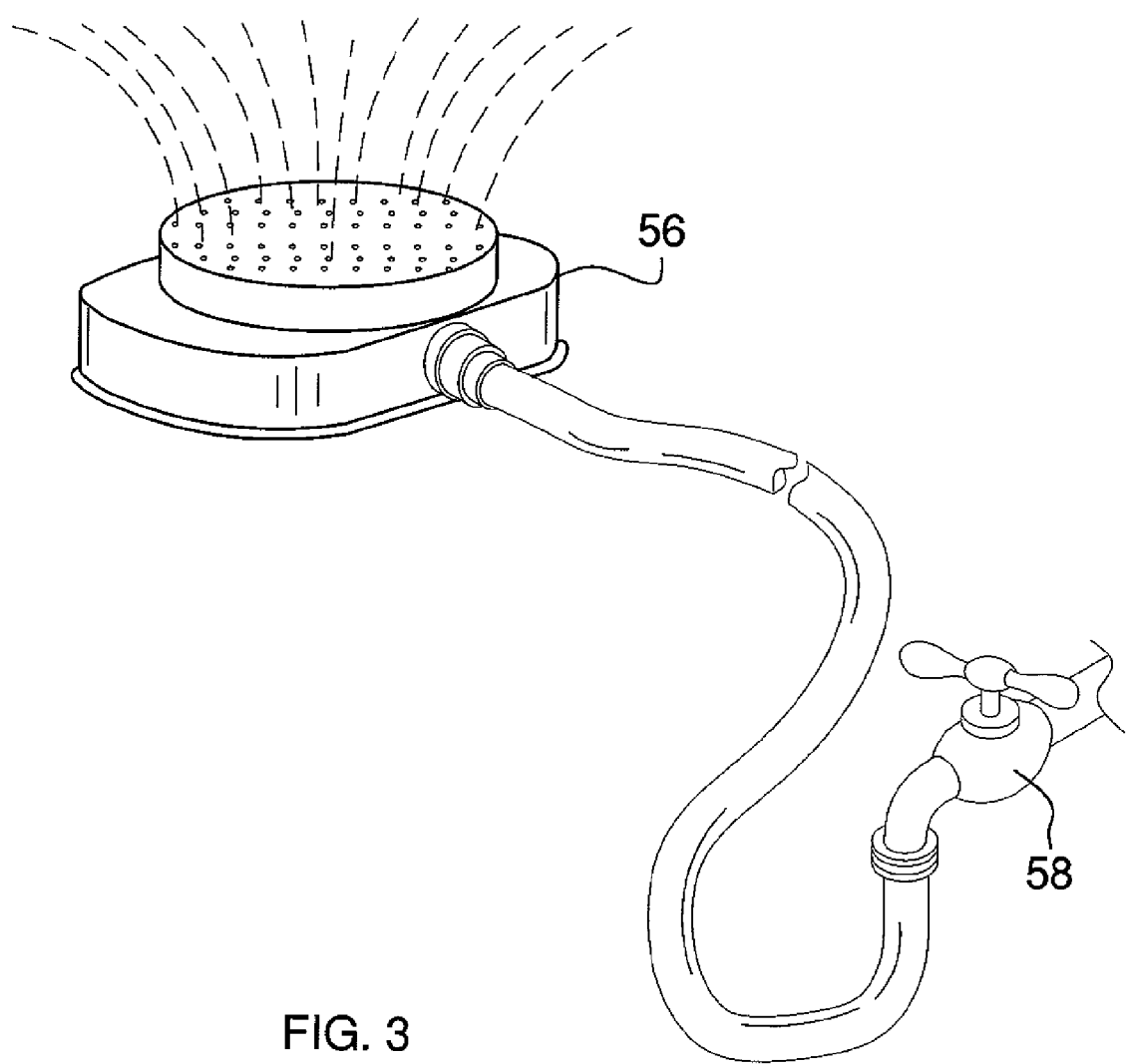
FIG. 3 is a top perspective view of a fluid ejecting assembly of an embodiment of the disclosure.

With reference now to the drawings, and in particular to FIGS. 1 through 6 thereof, a new vehicle washing device embodying the principles and concepts of an embodiment of the disclosure and generally designated by the reference numeral 10 will be described.

As best illustrated in FIGS. 1 through 6, the vehicle washing apparatus 10 generally comprises a covering 12 that is positionable on a vehicle 14. The covering 12 is flexible and has a top side 16 and a bottom side 18. The covering 12 is water permeable and may comprise a netting material.

A housing 20 has a top wall 22, a bottom wall 24 and a perimeter wall 26 that is attached to and extends between the top 22 and bottom 24 walls. A plurality of cleaning assemblies 28 is provided. Each of the cleaning assemblies 28 is rotatably mounted to the housing 20 and includes a plurality of bristles 30 extending downwardly from the bottom wall 24. The bristles 30 may be replaced with other cleaning implements such as a cleaning pad.

A drive assembly 32 is mounted in the housing 20 and is mechanically coupled to the cleaning assemblies 28. The drive assembly 32 rotates each of the cleaning assemblies 28 when the drive assembly 32 is turned on. The drive assembly 32 may include one or more electric motors 34 mounted within said housing. If pairs of cleaning assemblies 28 are utilized, each pair may include one motor 34 wherein the motor 34 is directly coupled to one of the cleaning assemblies 28 and coupled to the other of the cleaning assemblies by way of gears 36, belts or other conventional means.

Figure 5:
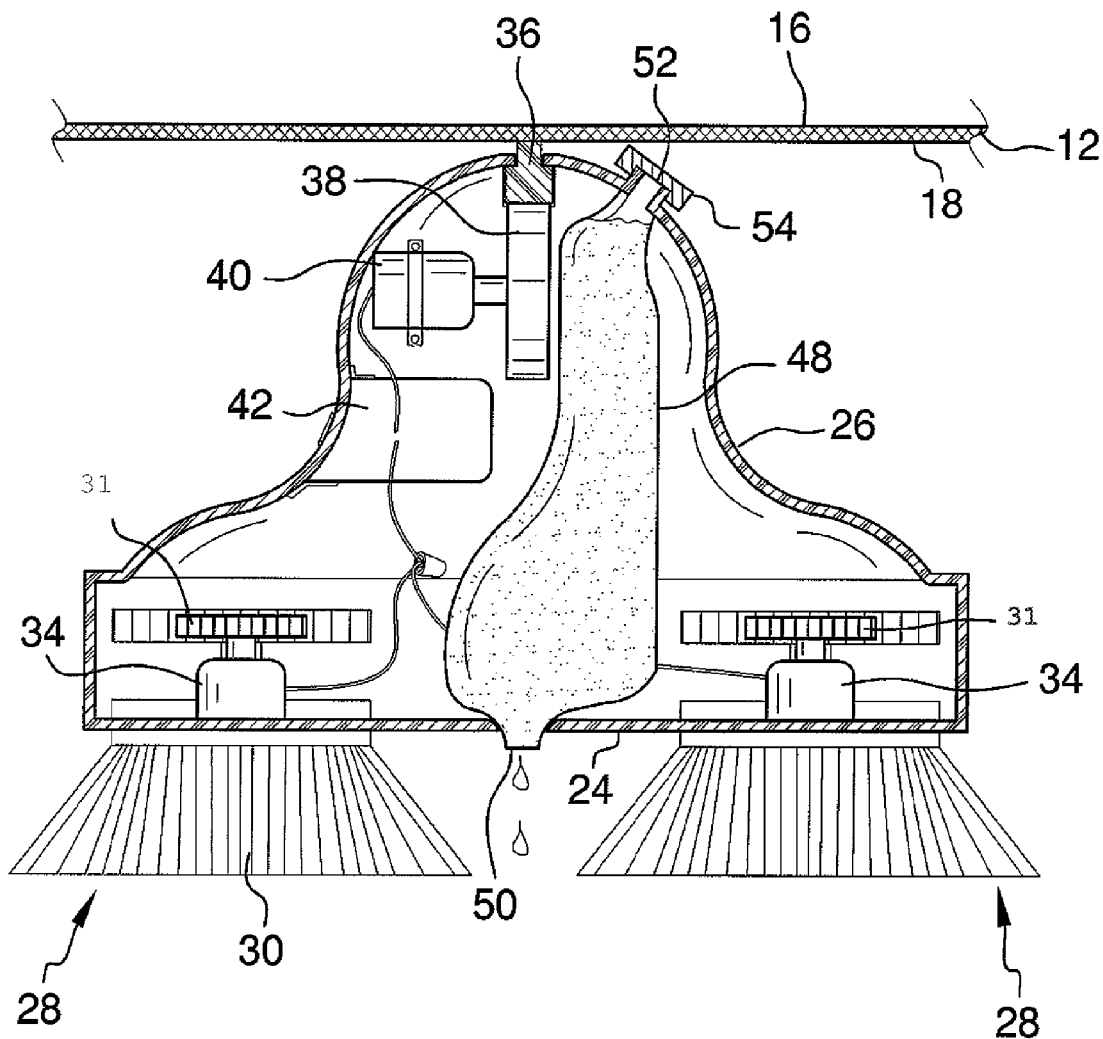
FIG. 5 is a cross-sectional view taken along line 5-5 of FIG. 4 of an embodiment of the disclosure.
Figure 6:
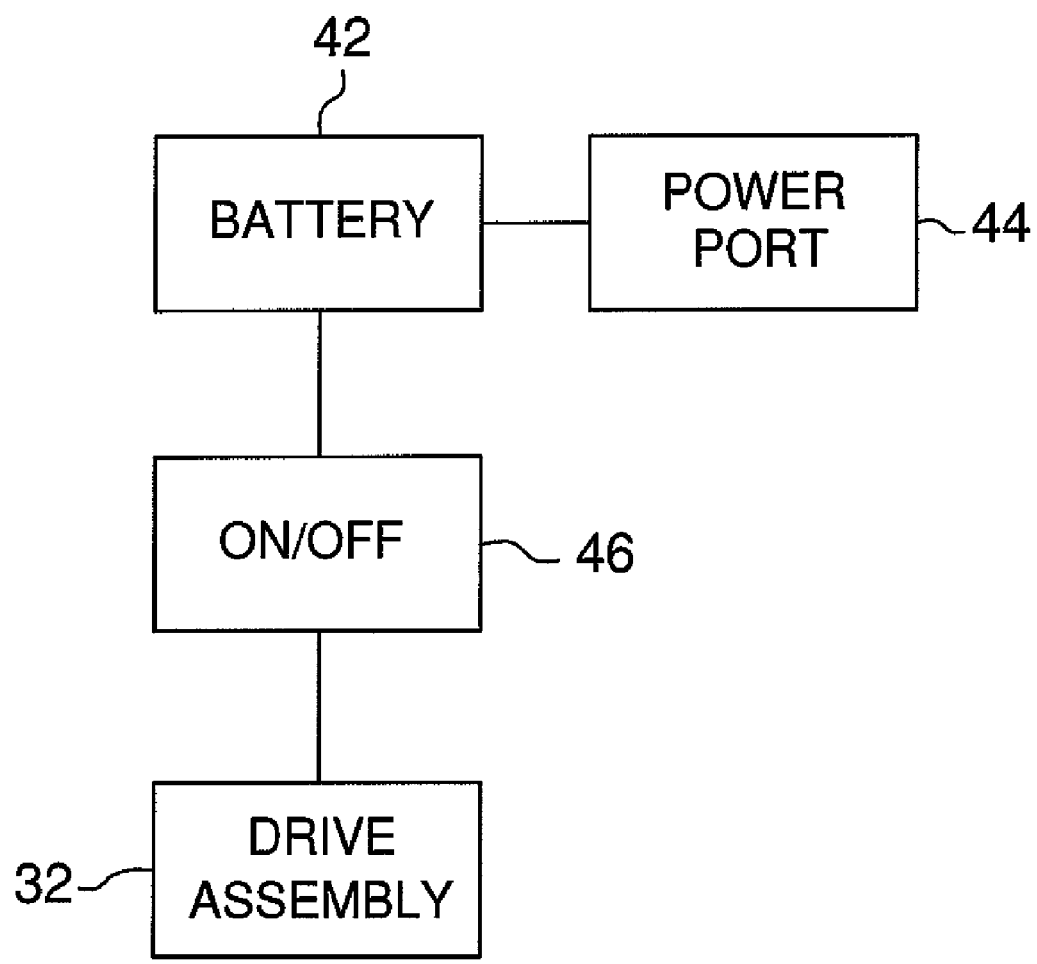
FIG. 6 is a schematic view of an embodiment of the disclosure.

A track 36 is attached to the bottom side 24 of the covering 12. The track 36 is coupled to the housing 20 and the housing 20 is movable along the track 36. As shown in FIG. 5, the track 36 may be extended into and coupled to the top wall 22. A drive member 38 is mounted in the housing 20 and engages the track 36. The drive member 38 may comprise a wheel that is mechanically coupled to the drive assembly 32. The drive assembly 32 may include a separate motor 40 coupled to the drive member 38. The drive assembly 32 rotates the drive member 38 to move the housing 20 along the track 36 when the drive assembly 32 is turned on.

A power supply 42 is mounted within the housing 20 and is electrically coupled to the drive assembly 32. The power supply 42 may include a rechargeable battery that includes a power port 44 couplable to a power source to selectively recharge the battery. An actuator 46 is electrically coupled to the power supply 42 to selectively turn the drive assembly 32 on or off.

A container 48 is mounted in the housing 20. The container 48 has a dispensing aperture 50 fluidly coupled thereto that extends outwardly of the housing 20. A cleansing fluid may be positionable in the container 48 to flow outwardly through the dispensing aperture 50 and on the vehicle 14. The dispensing aperture 50 extends through the bottom wall 24. The container 48 has a fill aperture 52 fluidly coupled thereto and extending through the housing 20. A cover 54 is removably positioned on the fill aperture 52.

A fluid ejecting assembly 56 is couplable to a water source 58 to spray water onto the covering 12 which will flow through the covering 12 and onto the vehicle 14. The fluid ejecting assembly 56 provides a water source to assist in cleaning the vehicle 14.

Figure 4:
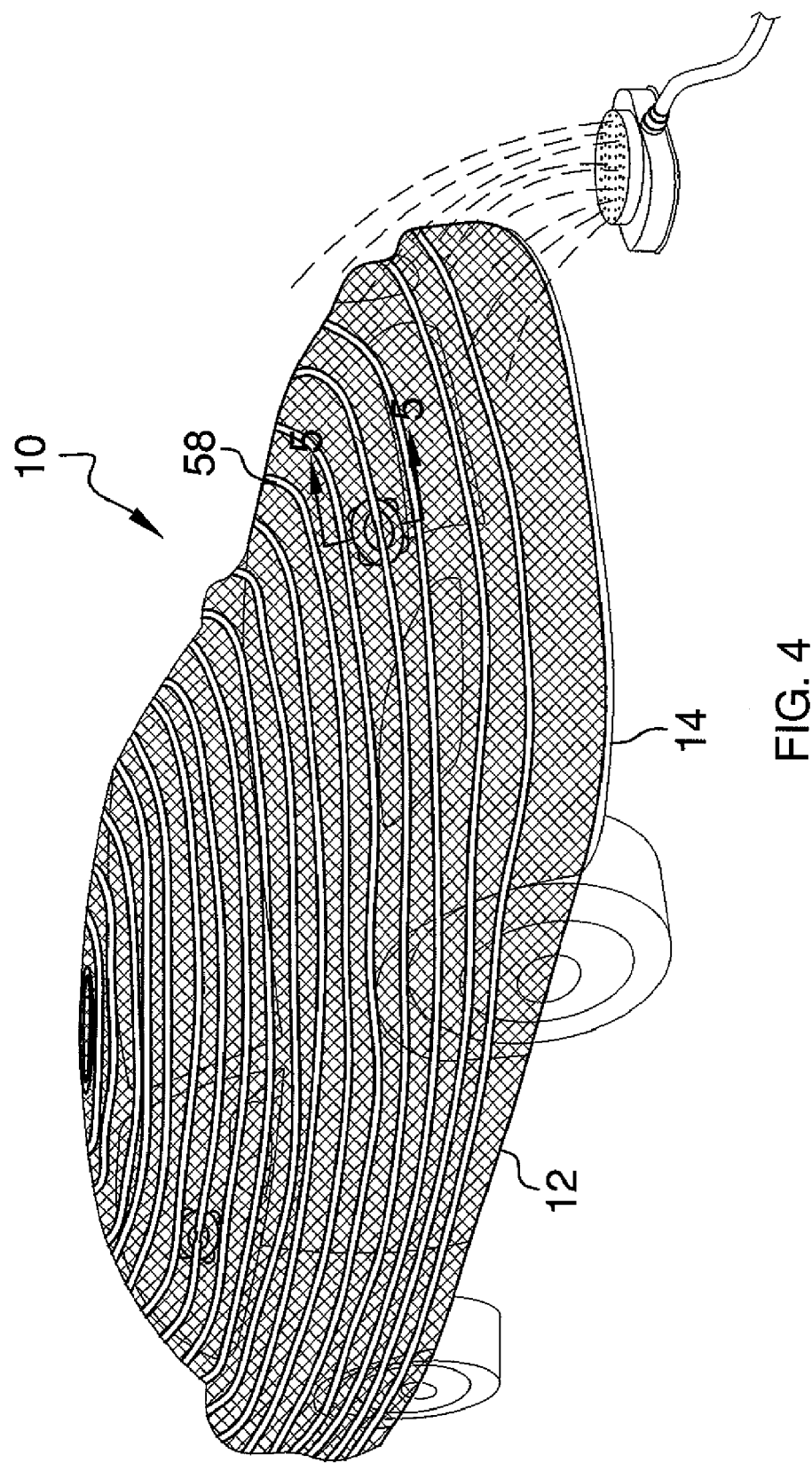
FIG. 4 is an-use top perspective view of an embodiment of the disclosure.

In use, the housing 20 travels along the track 36 while the cleaning assemblies clean the vehicle 14. The track 36 may include either concentric rings or a spiral design. As shown in FIG. 4, multiple housings 20 may be used simultaneously.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A vehicle cleaning system comprising:
   a covering being positionable on a vehicle, said covering being flexible and having a top side and a bottom side;
   a housing having a top wall, a bottom wall and a perimeter wall being attached to and extending between said top and bottom walls;
   a cleaning assembly being rotatably mounted to said housing and including a plurality of bristles extending downwardly from said bottom wall;
   a drive assembly being mounted in said housing and being mechanically coupled to said cleaning assembly, said drive assembly rotating said cleaning assembly when said drive assembly is turned on;
   a track being attached to said bottom side of said covering, said track being coupled to said housing and said housing being movable along said track;
   a drive member being mounted in said housing and engaging said track, said drive member being mechanically coupled to said drive assembly, said drive assembly rotating said drive member to move said housing along said track when said drive assembly is turned on; and
   wherein said housing travels along said track while said cleaning assembly cleans the vehicle.

2. The system according to claim 1, wherein said covering is water permeable.

3. The system according to claim 2, further including a fluid ejecting assembly being couplable to a water source to spray water onto said covering.

4. The system according to claim 3, further including a container being mounted in said housing, said container having a dispensing aperture fluidly coupled thereto and extending outwardly of said housing, wherein a cleansing fluid may be positionable in said container to flow outwardly through said dispensing aperture and on the vehicle.

5. The system according to claim 1, further including a power supply being mounted within said housing and being electrically coupled to said drive assembly.

6. The system according to claim 1, further including a container being mounted in said housing, said container having a dispensing aperture fluidly coupled thereto and extending outwardly of said housing, wherein a cleansing fluid may be positionable in said container to flow outwardly through said dispensing aperture and on the vehicle.

7. The system according to claim 6, wherein said container has a fill aperture fluidly coupled thereto and extending through said housing, a cover being removably positioned on said fill aperture.

8. A vehicle cleaning system comprising:
   a covering being positionable on a vehicle, said covering being flexible and having a top side and a bottom side, said covering being water permeable;
   a housing having a top wall, a bottom wall and a perimeter wall being attached to and extending between said top and bottom walls;
   a plurality of cleaning assemblies, each of said cleaning assemblies being rotatably mounted to said housing and including a plurality of bristles extending downwardly from said bottom wall;
   a drive assembly being mounted in said housing and being mechanically coupled to said cleaning assemblies, said drive assembly rotating each of said cleaning assemblies when said drive assembly is turned on;
   a track being attached to said bottom side of said covering, said track being coupled to said housing and said housing being movable along said track;
   a drive member being mounted in said housing and engaging said track, said drive member being mechanically coupled to said drive assembly, said drive assembly rotating said drive member to move said housing along said track when said drive assembly is turned on;
   a power supply being mounted within said housing and being electrically coupled to said drive assembly;
   an actuator being electrically coupled to said power supply to selectively turn said drive assembly on or off;
   a container being mounted in said housing, said container having a dispensing aperture fluidly coupled thereto and extending outwardly of said housing, wherein a cleansing fluid may be positionable in said container to flow outwardly through said dispensing aperture and on the vehicle, said dispensing aperture extending through said bottom wall, said container having a fill aperture fluidly coupled thereto and extending through said housing, a cover being removably positioned on said fill aperture;
   a fluid ejecting assembly being couplable to a water source to spray water onto said covering; and
   wherein said housing travels along said track while said cleaning assemblies clean the vehicle.

\* \* \* \* \*